(No Model.)  3 Sheets—Sheet 1.

C. C. & J. A. BISHOP.
VEHICLE SPRING.

No. 259,797.  Patented June 20, 1882.

Attest:
F. H. Schott
N. R. Brown.

Inventor:
Charles C. Bishop
Joseph A. Bishop
pr J. C. Tasker atty (No Model.)  3 Sheets—Sheet 2.

C. C. & J. A. BISHOP.
VEHICLE SPRING.

No. 259,797. Patented June 20, 1882.

Attest:
F. H. Schott
A. R. Brown.

Inventor:
Charles C. Bishop
Joseph A. Bishop
by J. C. Tasker atty (No Model.) 3 Sheets—Sheet 3.

C. C. & J. A. BISHOP.
VEHICLE SPRING.

No. 259,797. Patented June 20, 1882.

Attest:
F. H. Schott.
A. R. Brown.

Inventor:
Charles C. Bishop
Joseph A. Bishop
pr J. C. Tasker atty

UNITED STATES PATENT OFFICE.

CHARLES C. BISHOP AND JOSEPH A. BISHOP, OF NASHVILLE, TENNESSEE, ASSIGNORS TO CASWELL C. BISHOP, OF SAME PLACE.

VEHICLE-SPRING.

SPECIFICATION forming part of Letters Patent No. 259,797, dated June 20, 1882.

Application filed February 18, 1882. (No model.)

*To all whom it may concern:*

Be it known that we, CHARLES C. BISHOP and JOSEPH A. BISHOP, citizens of the United States, residing at Nashville, in the county of Davidson and State of Tennessee, have invented certain new and useful Improvements in Vehicle-Springs; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in equalizing trussed springs for side-bar and other vehicles; and it consists in the construction and arrangement of parts, as hereinafter more fully described and claimed.

Figure 1:
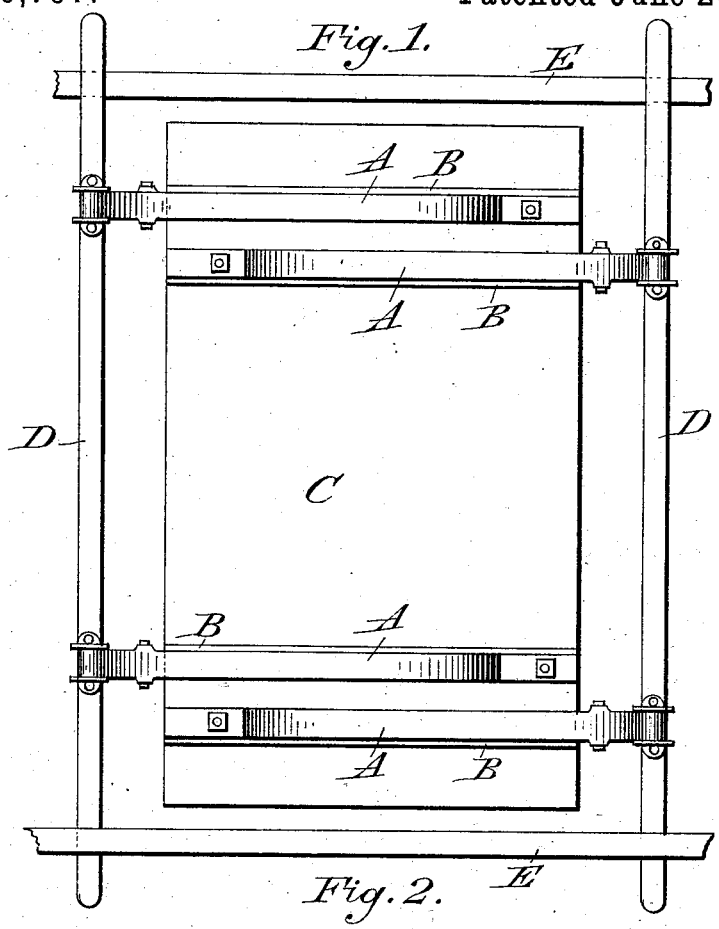
Figure 2:
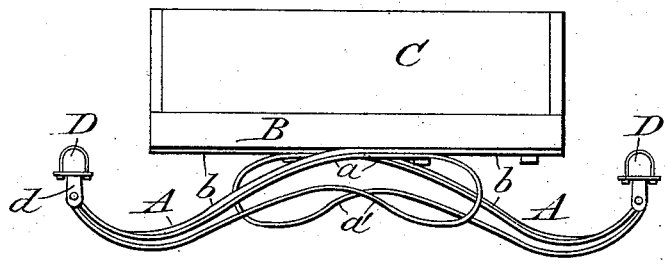
Figure 3:
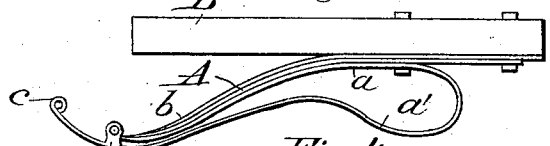
Figure 4:
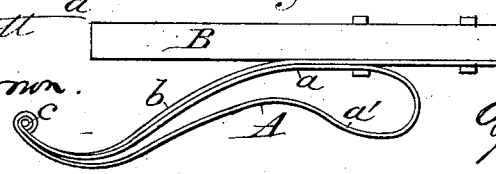
Figure 5:
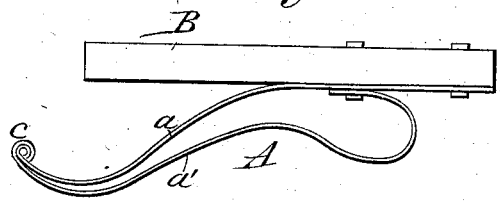
Figure 6:
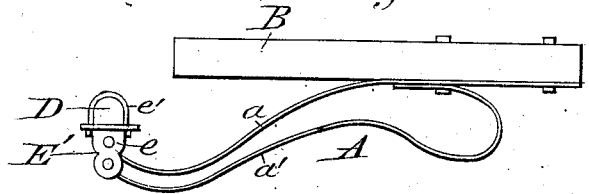
Figure 7:
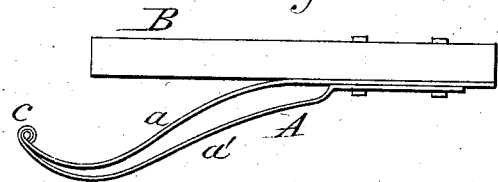
Figure 13:
Figure 14:
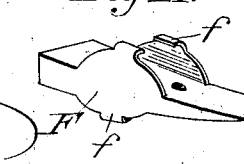
Figure 15:
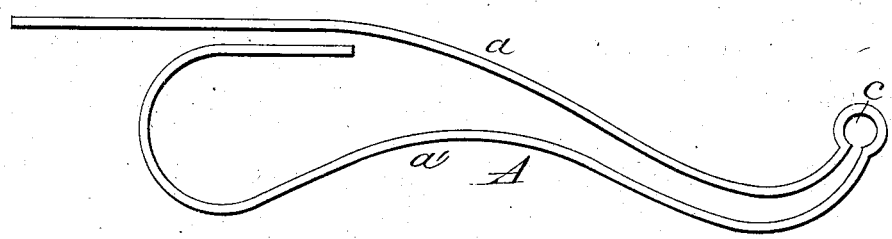
Figure 16:
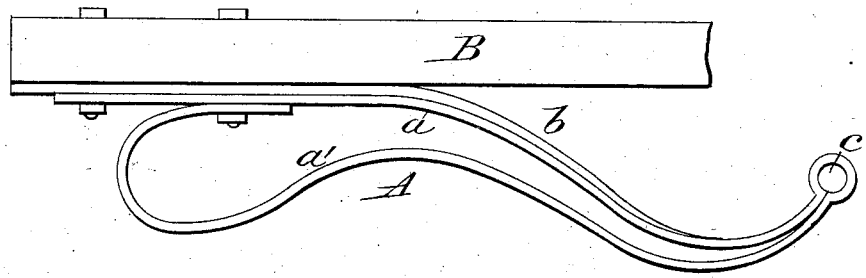

In the annexed drawings, which fully illustrate the invention, Figure 1 is a bottom plan of a side-bar vehicle with our improved crossed transverse springs in position. Fig. 2 is an end view of the same. Figs. 3 and 4 illustrate our improved spring formed in one continuous piece, and showing the upper plate re-enforced by additional plates or leaves. Figs. 5, 6, and 7 illustrate the upper and lower sections of the spring formed in separate pieces. Figs. 8, 9, 10, 11, 12, 13, and 14 illustrate various devices for connecting the outer ends of the upper and lower plates of the springs; and Figs. 15 and 16 are enlarged views of our improved continuous spring.

Like letters indicate like parts in the several views.

The letter A denotes the springs, and B a bar or bars, forming part of the bed or bottom of the carriage-body C, the springs being bolted or otherwise secured to said bars, as found convenient. D represents the side bars, and E the axles.

The springs A A are formed in halves, which are attached to the vehicle-body and side bars, as shown in Figs. 1 and 2, so as to cross or lap each other. Instead of being employed as transverse springs, in which event they are secured to the carriage-body and side bars, as shown, it is obvious that they may be attached by their outer ends to the axles, or to the rear axle and head-block, and used as longitudinal springs, if so desired.

In Figs. 2, 3, and 4 the upper plate, $a$, and lower plate, $a'$, of the spring A are formed in one continuous piece, the outer end of the lower plate being provided with an eye, $c$, for securing the spring to the side bar. Commencing at this eye, the lower plate, $a'$, is curved downward and gradually inward, and then upward in a suitable shape, until it has passed the center a sufficient distance, when it is curved downward and then abruptly upward, so as to change or reverse the direction, and thus form the upper plate, $a$, which extends backward along the general shape of the lower section or plate, being separated therefrom by an intervening space.

The outer end of the upper plate, $a$, may be secured to a shackle, $d$, attached near the end of the lower plate, $a'$, as shown in Fig. 3, or it may be turned into the eye $c$, as shown in Fig. 4.

The upper plates of the springs are preferably re-enforced by additional leaves or plates $b\ b$, as shown throughout the several views, these additional plates each extending at one end to or nearly to the extremity of the bar B, to which they are attached, while their opposite ends merge with the upper plates of the springs. Additional plates or leaves may also be used to strengthen and re-enforce the lower plates of the springs, if desired. These re-enforcing plates or leaves, whether applied to the upper or lower plate of the spring, are not essential, however, and may be dispensed with, as is shown in Figs. 5, 6, and 7. In these figures the upper and lower plates of the spring A, instead of being formed in one continuous piece, as shown in the remaining views, are made separate, the upper plate being extended to or nearly to the extremity of the bar B, to which it is bolted or otherwise suitably secured.

The inner end of the lower plate, $a'$, may be curved upward and backward along the upper plate, $a$, as shown in Figs. 5 and 6; or it may be secured to said plate in a horizontal position, as shown in Fig. 7. The outer ends of the upper and lower spring-plates may be turned together into a common eye, $c$, as before described, and as shown in Figs. 4, 5, and 7; or they may be united by means of either of the devices shown in Figs. 8, 9, 11, and 14; or the outer end of the upper plate may be secured to a shackle, d, attached at or near the outer end of the lower plate, as represented in Fig. 2 or 3.

Figure 9:
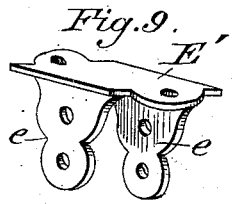

In Fig. 6 the outer ends of the plates a a' are united by means of a double shackle, E', which also secures the spring to the side bar. This shackle, as shown in Fig. 9, consists of a horizontal plate, having ears e e depending therefrom on each side. These ears or lugs are provided with perforations for the passage of bolts, which are passed respectively through an eye turned in the outer end of each spring-plate a a', thus holding the same apart, the horizontal portion of the shackle or jack being also provided with perforations for the passage of a band or staple, e', by which it is secured to the side bar, D, as shown in Fig. 6.

Figure 8:
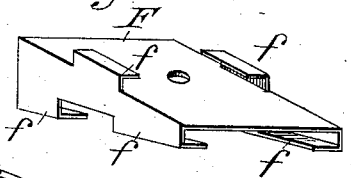
Figure 10:
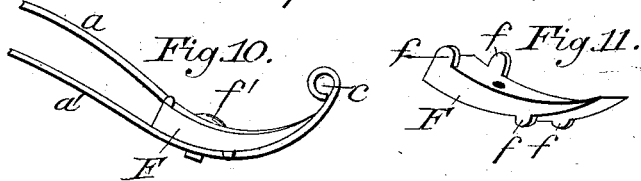
Figure 11:
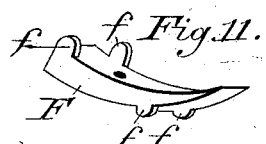
Figure 12:
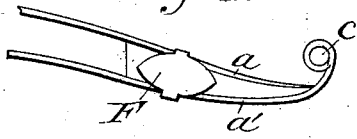

When the springs A A are connected to the side bars, either by means of the double shackle E' or by any other suitable device, it is often useful to separate the outer ends of the main plates of the spring and hold them apart, so as to diminish frictional wear. This we prefer to accomplish by means of a wedge-shaped plate or bearing, F, which is provided with suitable lugs or flanges, f, the forms of which may be varied in several ways, as shown in Figs. 8, 11, and 14. This plate or bearing F is placed between the upper and lower plates, a a', of the spring, at its outer end, where said plates merge or intersect, as shown in Figs. 10, 12, and 13, and is secured by a bolt or rivet, f', that is passed through the plates and their interposed bearing. By this means we obviate all tendency to frictional wear of the spring-plates and produce an elastic, smooth, and easy motion.

The lugs or flanges f f, with which the bearing-plates F are provided, serve to assist in holding the leaves or plates of the spring in position, and prevent lateral motion of the same.

We have described the upper and lower plates of the springs A A as being formed in one continuous piece or in separate pieces, as desired, the essential features of the spring being the same in either case. When formed in one continuous piece the upper and lower plates of the mainspring may be arranged as shown in Figs. 2, 3, and 4, in which the open portion of the continuous spring-plate is at its outer end; or the open portion of the spring may be at its inner end and the outer end be provided with an eye, c, integral with both the upper and lower plates, as shown in Figs. 15 and 16. The continuous spring shown in Fig. 15 is formed of a single piece of suitable spring-steel of the best quality, and is bent in the form shown, the inner end of the lower plate, a', being curved upward and backward along the under side of the upper plate, to which it is secured, as shown in Fig. 16, and the outer ends of the upper and lower plates being united in an eye, c, which is integral with both plates.

A strong elastic spring is thus produced which may be used either with or without a reenforcing plate, b, as may be desired, and when forced to its proper position, as shown in Fig. 16, will be found to possess a large degree of tensile force.

By means of the construction illustrated in the several views we have succeeded in producing a durable and elastic equalizing-spring for side-bar and other vehicles. The outer ends of the spring-plates, being separated and held apart in the manner described, are protected from frictional wear without any tendency to diminish their elasticity, and the arrangement of the lower plate being such that it will act as an elastic truss to the upper plate, all liability of rocking or side motion is avoided. By this construction of spring, as compared with others of similar character, we can produce a much stronger spring with the same material and weight or a much lighter spring with the same strength possessed by others.

Having thus described our invention, what we claim as new, and desire to secure by Letters Patent, is—

1. An equalizing trussed spring for side-bar and other vehicles, composed of an upper and a lower plate formed in one continuous piece, and having at its outer end an eye integral with both plates, substantially as described.

2. The combination, with a vehicle-spring composed of the plates a a', of a bearing-plate, F, arranged between the outer ends of said spring-plates, and having flanges f, adapted to clasp the same, substantially as shown and described.

In testimony whereof we affix our signatures in presence of two witnesses.

CHARLES C. BISHOP.
JOSEPH A. BISHOP.

Witnesses:
J. L. WEAKLEY,
E. E. BISHOP.